United States Patent [19]

Someno

[11] Patent Number: 5,737,138
[45] Date of Patent: Apr. 7, 1998

[54] OPTICAL WAVEGUIDE DEVICE AND METHOD OF MAKING THE SAME

[75] Inventor: Yoshihiro Someno, Miyagi-ken, Japan

[73] Assignee: Alps Electric Co., Ltd., Tokyo, Japan

[21] Appl. No.: 684,362

[22] Filed: Jul. 19, 1996

[30] Foreign Application Priority Data

Aug. 16, 1995 [JP] Japan .................. 7-208786

[51] Int. Cl.⁶ .................................................. G02B 6/36
[52] U.S. Cl. ........................ 359/900; 385/49; 385/147; 385/83; 385/45
[58] Field of Search .................. 385/49, 88, 89, 385/83, 45, 147

[56] References Cited

U.S. PATENT DOCUMENTS 4,765,702  8/1988  Dohn et al. .................. 385/49
5,018,817  5/1991  Suzuki et al. ................ 385/49
5,123,068  6/1992  Hakoun et al. .............. 385/49

FOREIGN PATENT DOCUMENTS 4-175705  6/1992  Japan.

*Primary Examiner*—John Ngo
*Attorney, Agent, or Firm*—Guy W. Shoup; Patrick T. Bever

[57] ABSTRACT

The present invention relates to an optical waveguide device, particularly a structure for positioning end faces of an optical waveguide and end faces of optical fibers with respect to each other, as well as a method of realizing such a structure. V grooves for positioning optical fibers are formed on a glass substrate by hot pressing, and the optical fibers are put in the V grooves to position end faces of the optical fibers and end faces of an optical waveguide with respect to each other, thereby forming the optical waveguide device of the invention.

3 Claims, 3 Drawing Sheets

OPTICAL WAVEGUIDE DEVICE AND METHOD OF MAKING THE SAME

BACKGROUND OF THE INVENTION

The present invention relates to an optical waveguide device wherein an optical waveguide and optical fibers are optically coupled on a substrate, and a method of making the same. Particularly, the invention is concerned with a structure for positioning end faces of an optical waveguide and end faces of optical fibers with respect to each other, as well as a method of realizing such a structure.

Generally, in an optical waveguide device wherein an optical waveguide and optical fibers are coupled together optically, it is necessary to accurately position and fix end faces of the optical waveguide and the optical fibers.

Heretofore, in connection with coupling together an optical waveguide and optical fibers there has been proposed a method wherein grooves for positioning and fixing optical fibers are formed on a substrate such as a ceramic or a silicon substrate by, for example, anisotropic etching or grinding using a grindstone. As to the V grooves for positioning optical fibers, it has been proposed, for example, in Japanese Patent Laid Open No. Hei4-175705(1992).

However, according to the method of forming V grooves on a substrate such as a ceramic or a silicon substrate by, for example, anisotropic etching or grinding using a grindstone, it is impossible to form an accurate V shape of grooves due to variations in machining accuracy. For example, if the bottom of a V groove is not an accurate V shape but becomes blunt, it is impossible to position and fix an optical fiber accurately, with the result that the machining process becomes complicated and expensive.

Further, the optical waveguide is usually formed of glass, and since the thermal expansion coefficient of a ceramic or a silicon substrate is larger than that of glass, there arises the problem that the coupling efficiency is deteriorated due to a change of temperature. Additionally, such a substrate as a ceramic or a silicon substrate does not transmit light, so when a large number of optical fibers are arranged in parallel, it is impossible to use an optical fiber of a small clad diameter and hence impossible to enlarge the pitch of adjacent optical fibers.

SUMMARY OF THE INVENTION

The present invention has been accomplished in view of the above-mentioned circumstances of the prior art and it is an object of the invention to provide an optical waveguide device capable of coupling together an optical waveguide and optical fibers accurately, as well as a method of making the same.

In order to achieve the above-mentioned object, the optical waveguide device manufacturing method according to the present invention is characterized by forming V grooves for positioning optical fibers on a glass substrate by hot pressing and disposing the optical fibers in the V grooves to position end faces of the optical fibers and end faces of an optical waveguide with respect to each other.

The optical waveguide device manufacturing method according to the present invention is also characterized by disposing a lock plate made of glass on the above glass substrate, followed by hot pressing to fix the optical fibers positioned in the V grooves.

In order to achieve the foregoing object, moreover, the optical waveguide device according to the present invention is characterized in that optical fibers are disposed in V grooves formed on a glass substrate by hot pressing to position end faces of the optical fibers and end faces of an optical waveguide with respect to each other.

The optical waveguide device according to the present invention is also characterized in that a lock plate formed of glass is disposed on the above glass substrate, followed by hot pressing to fix the optical fibers positioned in the V grooves.

DETAILED DESCRIPTION OF THE INVENTION

Embodiments of the present invention will be described hereinunder with reference to the accompanying drawings.

Figure 1A:
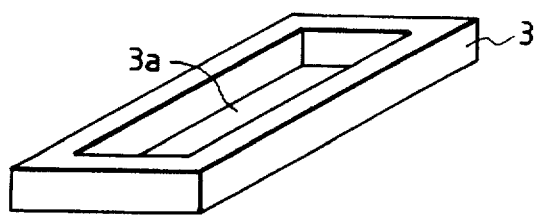
FIGS. 1A to 1D are explanatory views showing a optical waveguide device and a method of making the same according to an embodiment of the present invention.
Figure 1B:
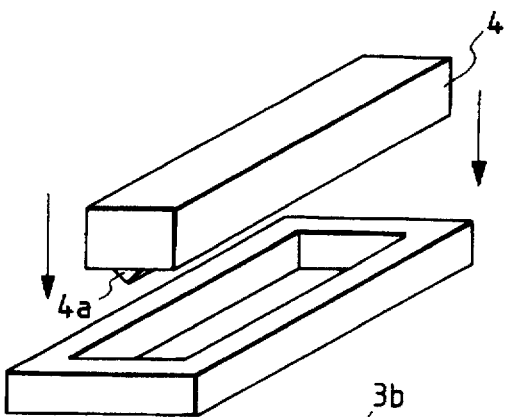
Figure 1C:
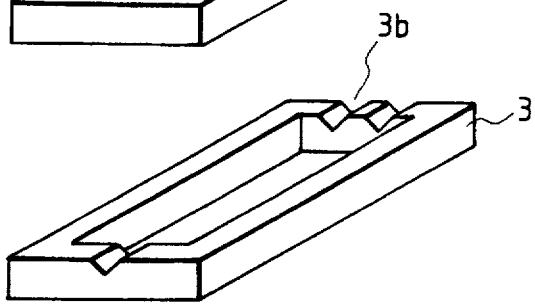
Figure 1D:
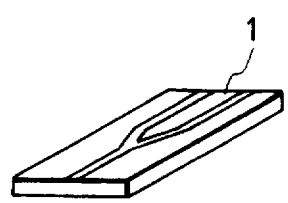
Figure 1D:
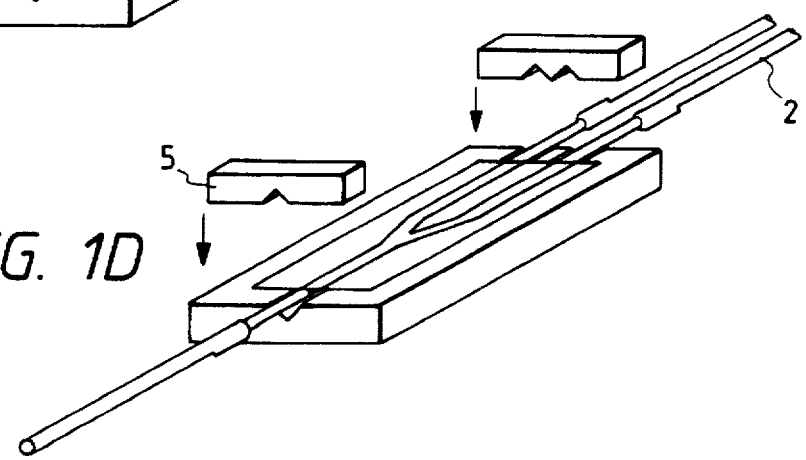
Figure 2:
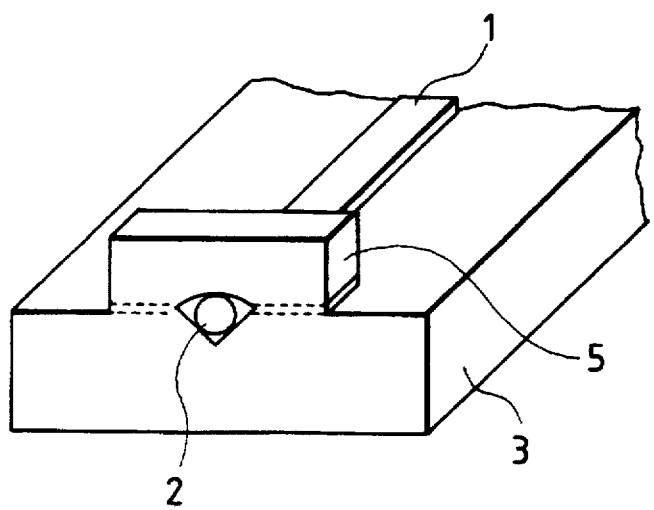
FIG. 2 is a view showing an appearance of the optical waveguide device in FIG. 1 in a completed state of its manufacture.
Figure 3A:
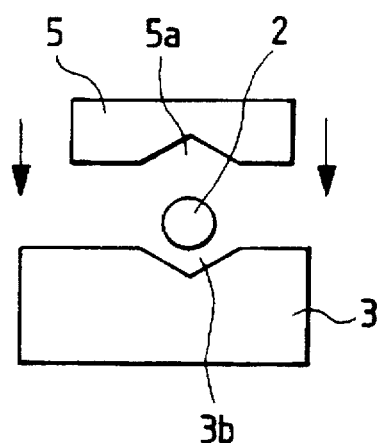
FIGS. 3A to 3C are explanatory views showing an optical fiber fixing process using a lock plate.
Figure 3B:
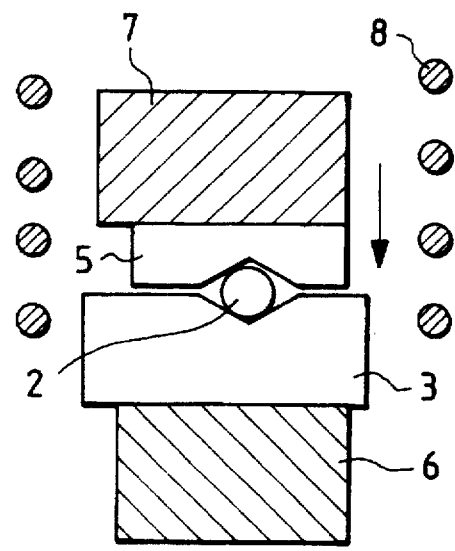
Figure 3C:
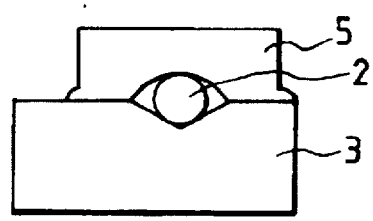

FIGS. 1A to 1D are explanatory views showing a optical waveguide device and a method of making the same according to an embodiment of the present invention, FIG. 2 is a view showing an appearance of the optical waveguide device in FIG. 1 in a completed state of its manufacture, and FIGS. 3A to 3C are explanatory views showing an optical fiber fixing process using a lock plate.

In the optical waveguide device illustrated in FIGS. 1 and 2, an optical waveguide 1 and a glass preform 3 for positioning and fixing optical fibers 2 are formed as separate components. The glass preform 3 is formed using an $SiO_2$-based glass for example. As shown in FIG. 1A, an opening 3a for fitting therein and positioning of the optical waveguide 1 is formed in the glass preform 3, and in order to form in the glass preform 3 V-groove guides 3b for positioning end faces of the optical waveguide 1 and the optical fibers 2, there is provided a hot pressing mold 4 having a projection 4a corresponding to each V-groove guide 3b, as shown in FIG. 1B.

The hot pressing mold 4 is pressed against the glass preform 3, both mold 4 and glass preform 3 being heated to a temperature above the glass transition point Tg and below the glass melting point At and pressurized. As a result, V grooves 3b are formed in the glass preform 3, as shown in FIG. 1C.

Next, as shown in FIG. 1D, the optical waveguide 1 is fitted in the opening 3a of the glass preform 3 and is thereby positioned and fixed therein. At the same time the optical fibers 2 are positioned in the V-groove guides 3b. Using lock plates 5 made of glass, the optical fibers 2 thus positioned in the V-groove guides 3b are fixed to the same guides by hot pressing, as shown in FIG. 2, so that their end faces are aligned with the end faces of the optical waveguide 1.

The hot pressing using lock plates 5 will now be described in detail with reference to FIG. 3. The lock plates 5 are formed with V-groove guides 5a for positioning the optical fibers 2. The optical fibers 2 are fixed by all of the lock plates 5, glass preform 3 and upper and lower V-groove guides 5a and 3b.

As the material of the lock plates 5 there is selected a material whose melting point is lower than the melting point At of the substrate of the glass preform 3. For example, as the glass preform 3 is used the following material:

Material: BK-7
Melting Point At: 624° C.
Transition Point Tg: 565° C.

On the other hand, as the material of the lock plates 5 is used the following material:

Material: SFS01
Melting Point At: 413° C.
Transition Point Tg: 393° C.

Next, as shown in FIG. 3B, the glass preform 3 is disposed on a fixed mold 6, then each optical fiber 2 is put in the associated V groove 3b of the glass preform 3, each lock plate 5 is put on the glass preform 3, a movable mold 7 is put on the lock plate 5, and ring heaters 8 for heating are disposed around both lock plate 5 and mold 6, followed by the application of heat and pressure at a temperature above the transition point Tg and below the melting point At of the lock plate 5, at a pressure of, for example, 40kg, so as to keep the temperature of the lock plate 5 higher than that of the glass preform 3 and prevent deformation of the glass preform. As a result, the optical fiber 2 is fixed in the V groove 3b of the glass preform 3, as shown in FIG. 3C. Thus, in the hot pressing using the lock plate 5 it is possible to prevent deformation of the glass preform 3 and of the V-groove guide 3b.

Figure 4A:
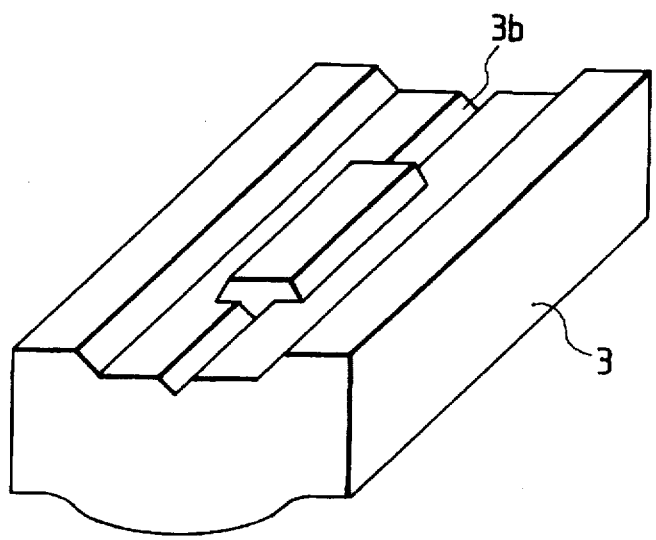
FIGS. 4A and 4B are explanatory views showing an optical waveguide device according to another embodiment of the present invention.
Figure 4B:
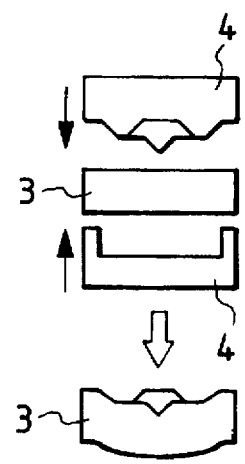
Figure 5A:
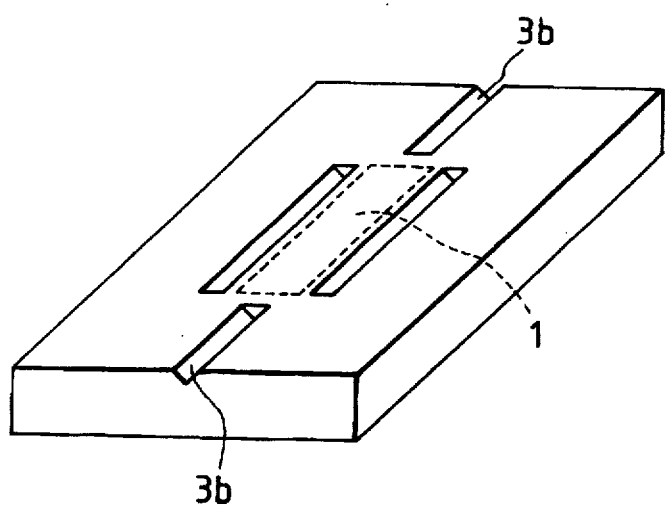
FIGS. 5A and 5B are explanatory views showing an optical waveguide device according to a further embodiment of the present invention.
Figure 5B:
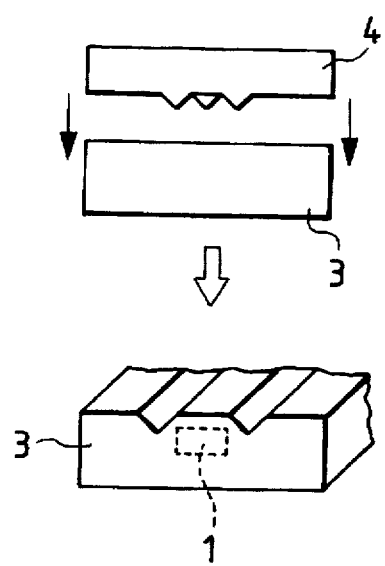

Although in the above embodiment the optical waveguide 1 and the glass preform 3 for positioning and fixing the optical fibers 2 are provided as separate components, the present invention is not limited thereto. The invention is also applicable to an optical waveguide device wherein an optical waveguide 1 and a glass preform 3 are formed integrally with each other. FIG. 4A is an appearance view showing a completed state of a ridge type waveguide device wherein an optical waveguide 1 is integrally formed in a raised shape on a glass preform, and FIG. 4B is an explanatory view showing how to manufacture such a ridge type waveguide device. FIG. 5A is an appearance view showing a completed state of a trench type waveguide device wherein an optical waveguide 1 is buried in a glass preform 3, and FIG. 5B is an explanatory view showing how to manufacture such a trench type waveguide device. Also in each of these cases, end faces of the optical waveguide 1 and end faces of optical fibers 2 can be accurately positioned with respect to each other by forming V-groove guides 3b on the glass preform 3 through hot pressing.

What is claimed is:

1. A method of making an optical waveguide device, comprising the steps of:

forming V grooves on a glass substrate by hot pressing;

disposing an optical fiber in one of said V grooves such that an end face of the optical fiber is aligned with and an end face an optical waveguide; and hot pressing a glass lock plate onto said glass substrate to fix the optical fiber in said one of said V grooves.

2. The method of making an optical waveguide device according to claim 1, further comprising the step of forming a V groove in the glass lock plate, wherein the step of hot pressing the glass lock plate further comprises aligning the V groove formed in the glass lock plate with said one of said V grooves formed in said glass substrate, with the optical fiber disposed therebetween.

3. The method of making an optical waveguide device according to claim 2, wherein said substrate is formed from a first glass material and said lock plate is formed from a second glass material, the glass transition temperature of the first glass material being higher than the glass transition temperature of the second glass material, and the melting point temperature of the first glass material being higher than the melting point temperature of the second glass material, and wherein the step of hot pressing said glass lock plate further comprises heating said glass lock plate to a temperature between said glass transition temperature and said melting point temperature of the second glass material.

* * * * *

UNITED STATES PATENT AND TRADEMARK OFFICE
CERTIFICATE OF CORRECTION

PATENT NO. : 5,737,138
DATED : April 7, 1998
INVENTOR(S) : Yoshihiro Someno

It is certified that error appears in the above-indentified patent and that said Letters Patent is hereby corrected as shown below:

In the Claims

In claim 1, line 5, delete "and".

In claim 1, line 6, after "face" insert --of--.

Signed and Sealed this

Twenty-seventh Day of April, 1999

Attest:

Q. TODD DICKINSON

Attesting Officer

Acting Commissioner of Patents and Trademarks